United States Patent
Hogberg et al.

[19]

[11] Patent Number: 6,157,840
[45] Date of Patent: Dec. 5, 2000

[54] METHOD AND APPARATUS FOR REAL-TIME CHANNEL RESOURCE ALLOCATION IN A COMMUNICATIONS SYSTEM

[75] Inventors: Shawn Wesley Hogberg, Chandler, Ariz.; Gerald Joseph Davieau, Eldersburg, Md.

[73] Assignee: Motorola Inc., Schaumburg, Ill.

[21] Appl. No.: 09/144,817

[22] Filed: Aug. 31, 1998

[51] Int. Cl.[7] ................................................ H04G 7/20
[52] U.S. Cl. ........................... 455/452; 455/509; 455/430
[58] Field of Search .................................. 455/12.1, 13.1, 455/427, 429, 430, 452, 453, 513, 509; 370/322

[56] References Cited

U.S. PATENT DOCUMENTS

| | | | |
|---|---|---|---|
| 5,448,621 | 9/1995 | Knudsen | 379/58 |
| 5,491,717 | 2/1996 | Hall | 375/205 |
| 5,590,395 | 12/1996 | Dickelman | 455/13.1 |
| 5,669,062 | 9/1997 | Olds et al. | 455/509 |
| 5,732,351 | 3/1998 | Olds et al. | 455/436 |
| 5,862,479 | 1/1999 | Cutler, Jr. et al. | 455/446 |
| 5,884,147 | 3/1999 | Reudink et al. | 455/452 |

*Primary Examiner*—Edward F. Urban
*Assistant Examiner*—Tilahun Gesesse
*Attorney, Agent, or Firm*—Dana B. LeMoine; James E. Klekotka

[57] ABSTRACT

A satellite (110 FIG. 1) is used to make channel allocations for SUs (120) in communications system (100). Satellite (110) operate within the confines of at least one subset of satellites. Satellites (110) allocate channels using a maximum cost list that is based on a cost function methodology. A list of potentially interfering antennas is determined using a cost function analysis. A list of active channels on each one the potentially interfering antennas is also established. Another list that includes a set of potentially interfering channels for each active channel is established. Cost functions are computed for each pair of active channels and its potentially interfering channels. These cost functions establish interference potentials for the available channels in the maximum cost list (400). Channels are allocated using the maximum cost list and interference potential thresholds. Cost functions are based on spatial isolation, spectral isolation, and temporal isolation.

19 Claims, 3 Drawing Sheets

METHOD AND APPARATUS FOR REAL-TIME CHANNEL RESOURCE ALLOCATION IN A COMMUNICATIONS SYSTEM

FIELD OF THE INVENTION

This invention relates generally to satellite communications systems and, more particularly, to a method and apparatus for providing real-time channel allocation in a communications system.

BACKGROUND OF THE INVENTION

In a satellite communications system, a number of communications satellites are used to provide communications services to a number of subscriber units (SUs). Communications satellites provide the communications channels necessary for the subscriber units to obtain communication services from the system. For a satellite communications system to offer global coverage, the communications satellites are generally organized into a constellation.

The communications satellites within the constellation have specific coverage patterns on the surface of the earth. Typically, these coverage patterns comprise a number of cells. These cells are associated with beams from directional antennas located on the satellite.

In many systems, channel management is established on a cellular level. Overlap regions can occur where cells overlap, and cell overlap, among other things, can lead to interference problems.

Cells usually have a limited amount of capacity associated with them. In some systems, the amount of capacity is determined by the amount of channels that are allowed to occur within a cell. Maximizing the utilization of this limited channel capacity is paramount in providing communications services to a large number of subscribers.

Maximizing spectral efficiency in a satellite communications system means consuming only those channels needed to service the instantaneous demand. An ideal system would allocate channels to subscribers in real time as demand for the channels is presented to the system. An ideal system would also allocate channels on a non-interfering basis.

What are needed are a method and apparatus for examining in real time an interference potential for each channel based on a subscriber unit's location relative to a set of active channels and for allocating a channel based on minimizing an interference potential.

BRIEF DESCRIPTION OF THE DRAWINGS

A more complete understanding of the invention can be derived by referring to the detailed description and claims when considered in connection with the figures, wherein like reference numbers refer to similar items throughout the figures, and:

DETAILED DESCRIPTION OF A PREFERRED EMBODIMENT

The method and apparatus of the present invention allow satellites to semi-autonomously allocate channels to subscriber units in real time without causing interference problems to occur. Satellites use cost functions to examine interference potentials and allocate channels based on minimized cost functions. In a preferred embodiment, interference potentials are examined in real time based on a subscriber unit's location.

The present invention is applicable to terrestrial-based and space-based communication systems. Systems may include geo-stationary (GEO) satellites and Non-GEO satellites.

In a preferred embodiment, communications channels are dynamically allocated and de-allocated in real-time based on actual demand using a regionalized channel allocation scheme in which regions are established based on satellite subsets.

In a preferred embodiment, a satellite allocates at least one channel using a maximum cost list (MC_LIST). A maximum cost list is established using a cost function methodology and a SU's location. Desirably, the size of the maximum cost list is established using the number of available channels given the SU's location and the size of the region used in the regionalized channel allocation scheme.

A list of potentially interfering antennas is established based on the SU's location. For example, potentially interfering antennas can have channels associated with them that should be considered in the maximum cost list calculations. Each antenna on the list of potentially interfering antennas is examined to establish lists of active channels. For example, an active channel can be a channel that is currently allocated, and a cost function associated with an active channel is high.

In addition, a list of potentially interfering channels for each active channel is determined. Desirably, each active channel has a list of potentially interfering channels associated with it. For example, a list of potentially interfering channels can computed using one or more cost functions.

Cost functions are computed for pairs of channels. Desirably, each pair consists of an active channel and one of the potentially interfering channels associated with the active channel. Computed cost functions are stored in MC_LIST using the active channel as a pointer. In alternate embodiments, cost functions can be computed using more than two channels.

When cost functions have been computed, MC_LIST comprises a current picture of currently active channels on the potentially interfering antennas and their impact on the rest of the available channels in the system from an interference potential point of view. That is, a channel with a large cost function associated with it has a high interference potential or high probability of producing interference.

Figure 1:
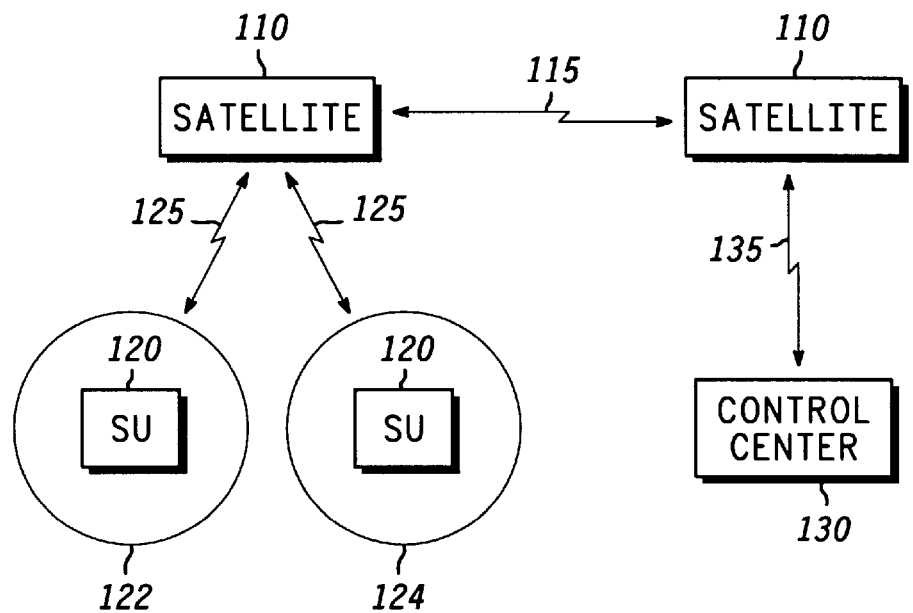
FIG. 1 shows a general view of a communications system in accordance with a preferred embodiment of the invention.

FIG. 1 shows a general view of a communications system in accordance with a preferred embodiment of the invention. Communications system 100, as illustrated in FIG. 1, comprises a plurality of satellites 110, a plurality of subscriber units (SUs) 120, and at least one control center 130. Satellites cooperate with each other both on a global basis and on a regional basis. Desirably, satellites cooperate with each other both globally and regionally when allocating channels to SUs. For example, satellites can be grouped into regionalized subsets, and satellites operate semi-autonomously within satellite subsets to allocate channels to SUs 120.

In a preferred embodiment, satellites examine interference potentials and allocate channels semi-autonomously using at least one potentially interfering antenna (not shown in FIG. 1). For example, antennas on satellites within a satellite subset can be potentially interfering antennas. Interference potentials and cost functions are computed and examined using various satellite antennas as potentially interfering antennas. Interference potentials are also examined using subsets of satellites.

For clarity, FIG. 1 illustrates only two satellites 110, only two SUs 120, and a single control center 130. This is done to facilitate the explanation of the invention. Different numbers of satellites, SUs, and ground stations, such as illustrated by control center 130, can be used. While the present invention is advantageously employed when a large number of satellites are being used, it is also applicable with as few as two satellites.

Generally, communications system 100 can be viewed as a network of nodes. As illustrated in FIG. 1, satellites can be viewed as semi-autonomous channel allocation nodes. Channels are allocated and de-allocated as the number and position of SUs and satellites changes.

As illustrated in FIG. 1, satellite 110 communicates with at least one other satellite 110 using crosslink 115. In FIG. 1, a single crosslink 115 is illustrated. This is done to facilitate the explanation of the invention. In a preferred embodiment, a number of satellites 110 and crosslinks 115 are used. In alternate embodiments, various numbers of satellites and crosslinks can be used. In other embodiments, crosslinks are not required.

In a preferred embodiment, satellite 110 communicates with other satellites 110 through crosslinks 115. Crosslinks are used to interconnect satellites into a network of nodes within communications system 100. Crosslinks 115, among other things, provide a network for carrying channel allocation information, channel assignment information and control data anywhere within system 100. In addition, crosslinks 115 are used to establish satellite subsets by interconnecting groups of satellites and are used to send and receive channel allocation data between members of the subsets.

As illustrated in FIG. 1, SUs 120 communicate with at least one satellite 110 using subscriber link 125. In FIG. 1, two subscriber links 125 are illustrated. This is done to facilitate the explanation of the invention. In various embodiments, a number of satellites 110, a number of SUs 120, and a number of subscriber links 125 are used.

In FIG. 1, a first SU 120 is illustrated at a first location 122 and a second SU 120 is illustrated at a second location 124. In a preferred embodiment, first location 122 is used in a channel allocation procedure for the first SU, and second location 124 is used in a channel allocation procedure for the second SU. SUs 120 can be located at various points on the surface of earth or in the atmosphere above earth. Communications system 100 can accommodate any number of SUs 120. SUs 120 are preferably SUs capable of transmitting and/or receiving data from satellites 110. By way of example, SUs 120 can comprise telephones, paging devices, computers, video devices, and other communications devices.

In a preferred embodiment, a frequency domain multiple access/time domain multiple access (FDMA/TDMA) communications system is used, and multiple access is provided using channels that are defined by time slots and frequencies. In alternate embodiments, different multiple access schemes can be used where channels are defined by time slots, frequencies, codes, and combinations thereof.

In FIG. 1, control center 130 communicates with satellites 110, which are within its field of view through links 135. Link 135 can be established between any satellite 110 and control center 130 that are within communication range of each other.

Desirably, satellites that provide cells that are spatially close to each other make up a satellite subset. In a preferred embodiment, satellite subsets are dynamically changing. For example, the number of satellites comprising a subset can change as satellites 110 move relative to each other. In addition, satellites 110 can move from one subset to another as satellites 110 move relative to each other.

Satellite movement, among other things, causes cells to move relative to each other causing interference potentials to change. In addition, a SU's location and the position of satellites 110 relative to the SU's location affect interference potentials.

Satellite subsets are used to improve the channel allocation process, by allowing satellites to determine in real time which channels have the lowest amounts of interference associated with them. Satellite subsets allow a global computational problem to be reduced to a regional computational problem.

When a satellite becomes a member of a particular subset, the satellite notifies the other satellites within the subset whenever it allocates or de-allocates a channel. The subset of satellites is also used to establish a list potentially interfering antennas. In addition, satellites use information maintained within a subset of satellites to update lists of potentially interfering antennas, active channels, and potentially interfering channels.

In a preferred embodiment, channel allocations within each satellite subset are maintained by each satellite within the subset. For example, each satellite can store lists of potentially interfering antennas and presently active channels for its particular satellite subset. In addition, each satellite can store at least one list of potentially interfering channels. In alternate embodiments, lists of potentially interfering antennas, lists of presently active channels and lists of potentially interfering channels can be sent to a satellite from a control center.

In a dynamically changing system, such as a satellite communications system, with hundreds of available channels and hundreds of opportunities for interference, the channel allocation procedure presents an enormous computational problem. To perform channel allocations in real-time, an efficient method for examining the interference potential of each channel that a SU could be allocated given the location of the SU is used.

In a preferred embodiment, the channel allocation procedure uses a single pass through a list of potentially interfering channels to lessen the computational problem. Desirably, a cost function approach is used. A cost function (CF) assigns a cost of using a particular channel at a first location for a particular time interval when another channel is in use at a second location during substantially the same time interval.

In various embodiments, a cost function can be a function of spatial isolation, spectral isolation, and temporal isolation. For example, a cost function can be as shown in equation 1:

$$CF = A(\text{spatial isolation}) * B(\text{spectral isolation}) * C(\text{temporal isolation}). \quad (1)$$

In a preferred embodiment, the cost function is as shown in equation 2:

$$CF = F(\text{antenna isolation}) * G(\text{channel isolation}). \quad (2)$$

In equation 2, function F( ) is a measure of the antenna and/or path loss isolation (spatial isolation) that exists between the two potentially interfering SUs. For example, spatial isolation can be determined from the mechanical and electrical characteristics of the antennas on the satellite and the SU. In addition, isolation can be determined based on the difference between the first SU's location and the second SU's location. When sufficient antenna isolation exists, the same channel can be used for two SUs. In this case, the cost function would be low because there is a large amount of isolation.

In equation 2, function G( ) is a measure of the isolation provided by the time/frequency separation between the two candidate channels. For example, two channels can be separated far enough in frequency or time so that there is not enough differential delay or Doppler to cause interference. In this case, antenna isolation is not required to provide any isolation, and the two channels can be simultaneously used on the same beam or on a pair of beams that have minimal antenna isolation. These beams can be on the same or different satellites.

Desirably, F( ) and G( ) cover a large range of possibilities that are dependent on the type of channels in use by the system and the details of the antenna designs being used within the system.

Figure 2:
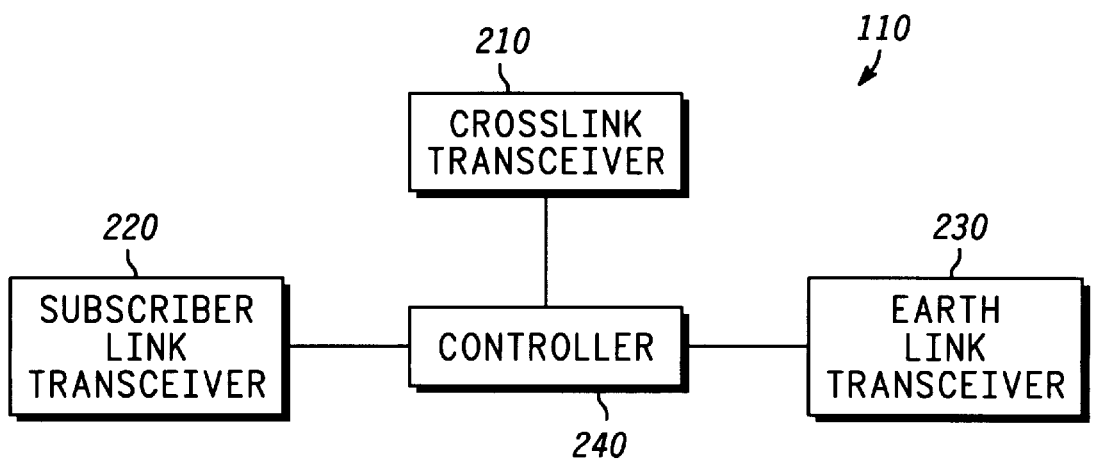
FIG. 2 illustrates a simplified block diagram of a satellite that has been adapted to semi-autonomously allocate communications channels to SUs in accordance with a preferred embodiment of the invention.

FIG. 2 illustrates a simplified block diagram of a satellite that has been adapted to semi-autonomously allocate communications channels to SUs in accordance with a preferred embodiment of the invention. Preferably, many or all satellites 110 (FIG. 1) within system 100 (FIG. 1) include equipment as illustrated by the simplified block diagram of FIG. 2. Satellite 110 comprises crosslink transceiver 210, subscriber link transceiver 220, earth link transceiver 230, and controller 240.

Crosslink transceiver 210 and associated antenna (not shown) support crosslinks to other satellites 110 (FIG. 1). In a preferred embodiment, each satellite supports at least one crosslink for communicating with at least one other satellite in a subset of satellites. Desirably, a FDMA/TDMA methodology is used to establish crosslinks.

Earth link transceiver 230 and associated antenna (not shown) support links to terrestrial-based communications devices, such as control center 130 (FIG. 1). In a preferred embodiment, each satellite supports at least one earth link for communicating with at least one control center 130. In addition, terrestrial-based communications devices can include, among other things, gateways and control centers.

In a preferred embodiment, earth links are used to provide, among other things, an initial list of available channels to a satellite. In alternate embodiments, earth links can be used to obtain, among other things, updated lists of available channels, updated lists of usable antennas, updated lists of currently active channels, and updated lists of potentially interfering channels for the currently active channels. Desirably, a FDMA/TDMA methodology is used to provide diversity on the earth links.

Subscriber link transceiver 220 and associated antenna (not shown) support links to terrestrial-based subscriber units, such as SU 120 (FIG. 1). In a preferred embodiment, each satellite comprises at least one antenna that supports a number of subscriber links for communicating with a number of SUs. In addition, subscriber links can be established with other terrestrial-based terminals, such as paging devices.

Controller 240 is coupled to crosslink transceiver 210, subscriber link transceiver 220, and earth link transceiver 230. Controller 240 could be implemented using one or more processors.

In a preferred embodiment, controller 240 controls the formation of subscriber links 125 (FIG. 1) by, among other things, determining subscriber link channels that are available, determining subscriber link channels that are required, and determining interference potentials for subscriber link channels. Controller 240 determines interference potentials using a cost function methodology as described below.

Controller 240 sends control information to subscriber link transceiver 220 so that satellites can allocate and de-allocate subscriber link channels at the appropriate times. In addition, controller 240 sends control information to earth link transceiver 230 and crosslink transceiver 210.

In a preferred embodiment, controller 240 is used to store data concerning the allocation of channels within a particular satellite and within the subset of satellites that the satellite is associated. For example, when a satellite allocates or de-allocates a particular subscriber link channel this information is stored in this satellite, and it is sent to and stored in other neighboring satellites.

In a preferred embodiment, controller 240 is used to store lists of potentially interfering antennas, lists of active channels, and lists of potentially interfering channels. In addition, controller 240 is used to stored cost function threshold values, available channel lists, and maximum cost lists.

For clarity and ease of understanding, FIG. 2 illustrates one crosslink transceiver 210, one subscriber link transceiver 220, one earth link transceiver 230, and one controller 240. In alternate embodiments, any number of these components could be used.

Figure 3:
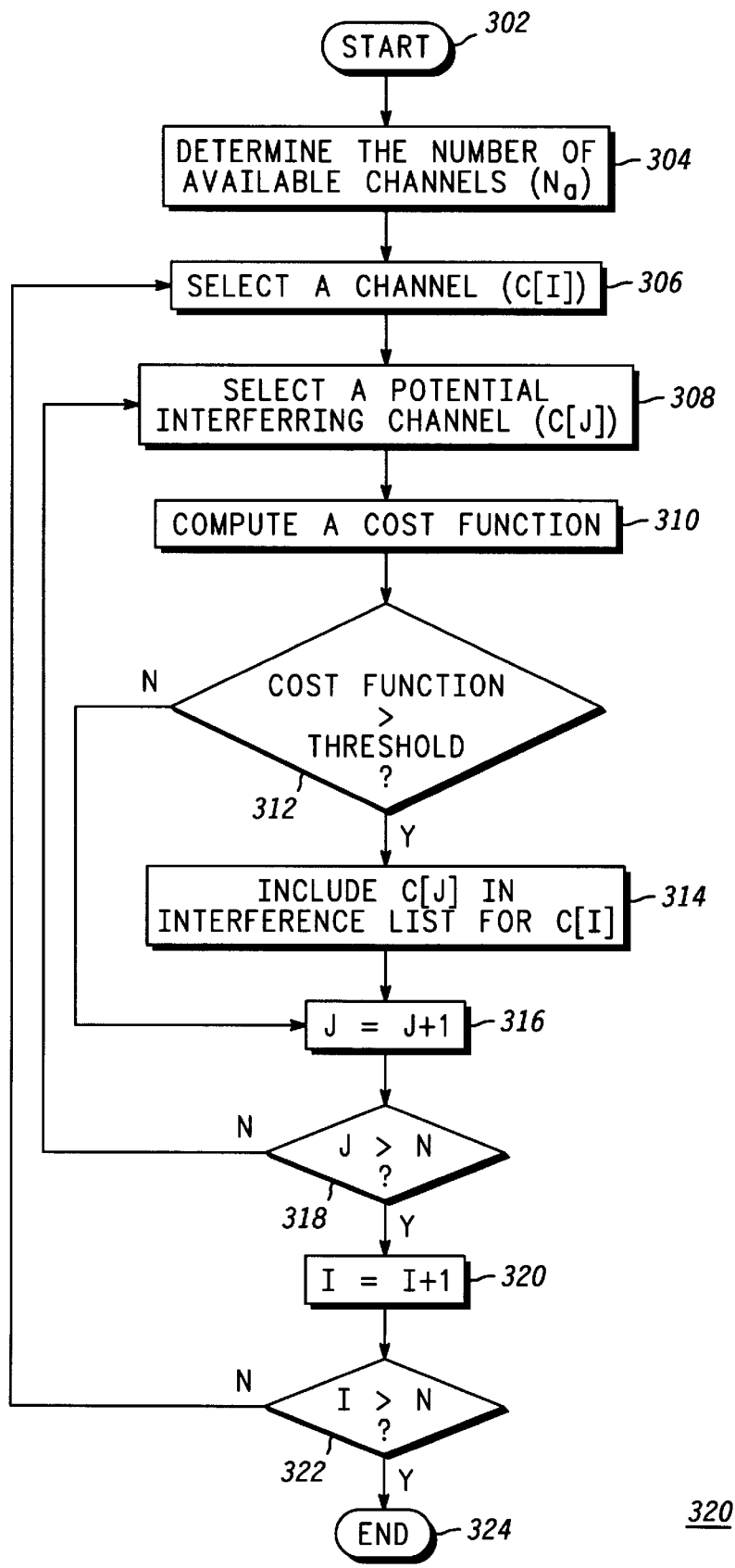
FIG. 3 illustrates a flow diagram of a procedure for determining potentially interfering channels that is performed in accordance with a preferred embodiment of the invention.

FIG. 3 illustrates a flow diagram of a procedure for determining potentially interfering channels that is performed in accordance with a preferred embodiment of the invention. Procedure 300 starts in step 302.

In step 304, the number of channels ($N_a$) that can be used within a system is determined. In a preferred embodiment, the channels that can be used are the available channels. Desirably, the number of available channels ($N_a$) is dependent on, among other things, the bandwidth in which the system is allowed to operate. In addition, local restrictions can affect the operating frequencies and bandwidths allowed in certain areas. Geo-political boundaries can establish further restrictions on the operating frequencies and bandwidths allowed.

In step 306, a channel ($C_I$) is chosen from the number of available channels ($N_a$). Desirably, this can be the I(th) channel in a list of available channels. In a preferred embodiment, $N_a$ and I are positive, non-zero integers. For example, the integer (I) can cover the range from one to $N_a$.

In step 308, a channel ($C_J$) is chosen that is a potentially interfering channel to channel ($C_I$). Desirably, each channel is considered to be an interfering signal to itself. In a preferred embodiment, $C_J$ is chosen from the list of available channels ($N_a$). In addition, J is a positive non-zero integer.

In step 310, a cost function is computed for this pair of channels ($C_I$, $C_J$). In general, a cost function can be based on spatial isolation, spectral isolation, and temporal isolation. In a preferred embodiment, a cost function depends on spectral isolation and spatial isolation. Temporal isolation is incorporated with spectral isolation.

In step 312, the computed cost function is compared to a threshold value. When the cost function is not less than the threshold value, then procedure 300 continues with step 314. When the cost function is less than the threshold value, then procedure 300 branches to step 316.

In step 314, channel $C_J$ is included in the potential interferer list for $C_I$. The cost function equaled or exceeded the threshold established; therefore, this channel is a potentially interfering channel for this particular operating channel $C_I$. Cost functions are spectrally dependent, spatially dependent, and temporally dependent. For example, a list of potentially interfering channels includes, among other things, those channels that are sufficiently close in frequency and/or time that system differential delay and/or Doppler could cause the two channels to interfere if the system did not provide sufficient antenna isolation.

In step 316, the counting variable J is incremented. This counting variable ensures that all the potentially interfering channels are considered.

In step 318, a query is performed to determine if all of the potential interferers have been considered. When all of the potential interferers have been considered ($J>N_a$), then procedure 300 continues with step 320. When all of the potential interferers have not been considered ($J=<N_a$), then procedure 300 branches to step 308 and iterates as shown in FIG. 3.

In step 320, the counting variable I is incremented. This counting variable ensures that all of the available channels have been considered.

In step 322, a query is performed to determine if all of the available channels have been considered. When all of the available channels have been considered (I>N), then procedure 300 ends in step 330. When all of the available channels have not been considered (I=<N), then the first counting variable is reset (J=1), and procedure 300 branches to step 306 and iterates as shown in FIG. 3.

In a preferred embodiment, procedure 300 is performed a minimum number of times. Desirably, procedure 300 is performed less than once a day during system operation. For example, procedure 300 could be repeated when the cost function used in step 310 changes. In addition, procedure 300 could be repeated when the threshold used in step 312 changes. Also, procedure 300 can be repeated when the number of available channels changes.

Figure 4:
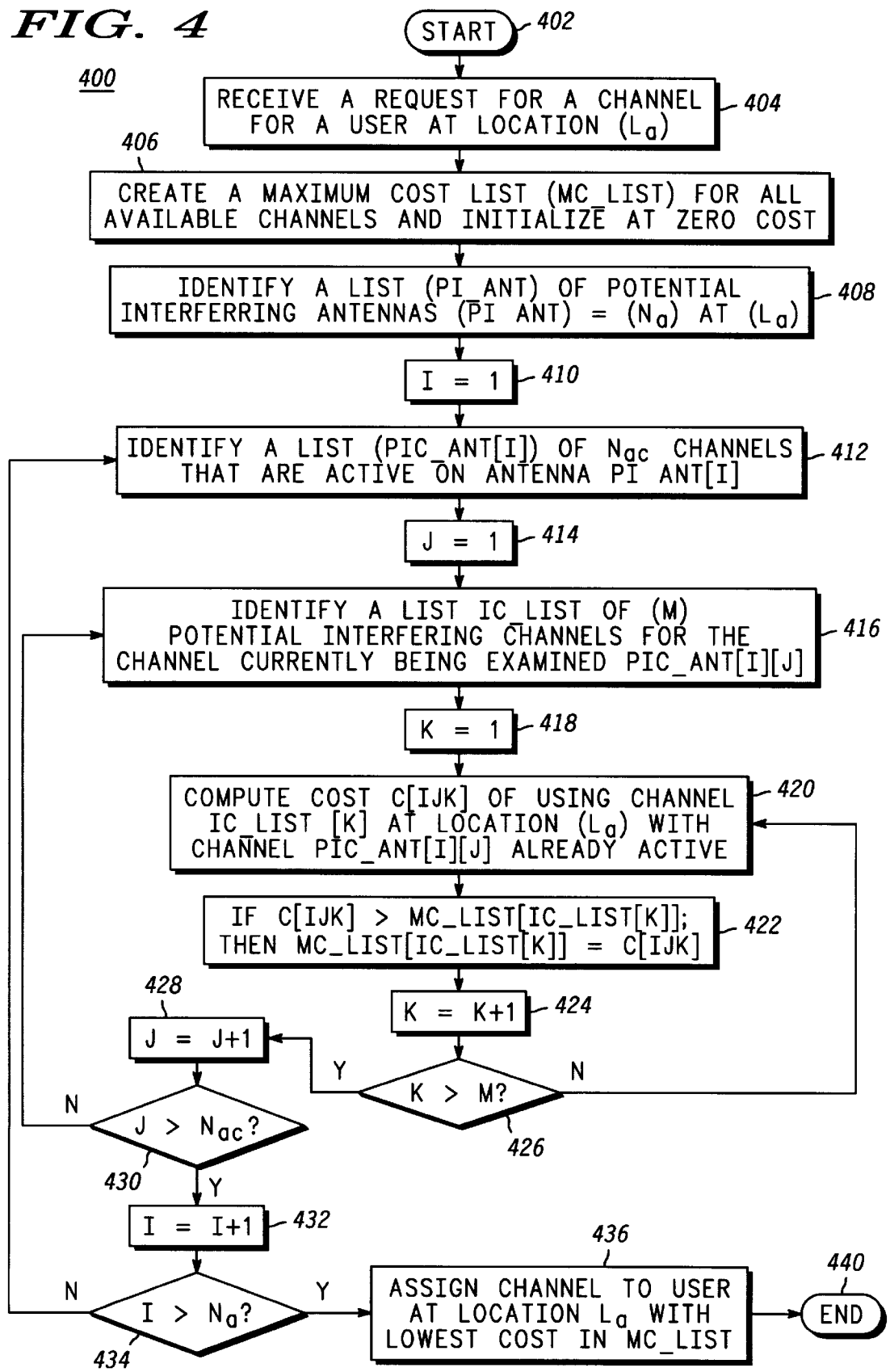
FIG. 4 illustrates a flow diagram of a procedure for examining interference potentials and allocating a channel to a SU based on a minimized cost function that is performed in accordance with a preferred embodiment of the invention.

FIG. 4 illustrates a flow diagram of a procedure for examining interference potentials and allocating a channel to a SU based on a minimized cost function that is performed in accordance with a preferred embodiment of the invention. Procedure 400 starts in step 402.

In step 404, a satellite determines that a new channel is required by a SU at a particular location, when it receives and processes a channel request. In a preferred embodiment, the satellite determines a location for the SU and establishes a time of occurrence for the channel request. For example, a SU at a first location can be requesting access to the system. In addition, a new channel could be required for a hand-off condition.

In step 406, a maximum cost list (MC_LIST) is created and initialized. In a preferred embodiment, MC_LIST comprises an entry for each channel in a set of available channels. In a preferred embodiment, the set of available channels is a subset of the plurality of channels in the system. In alternate embodiments, the set of available channels can include all the channels in the system. During initialization, entries are set to zero cost.

In step 408, a list (PI_ANT) of ($N_a$) potentially interfering antennas is identified. In a preferred embodiment, these $N_a$ antennas are antennas that could provide interference power to a subscriber unit at the first location ($L_a$).

In step 410, a first counting variable (I) is initialized. In a preferred embodiment, (I) is set to one. In alternate embodiments, different counting variables can be used and can be initialized to different values.

In step 412, a list (PIC_ANT[I]) of channels that are currently active on the potentially interfering antenna (PI_ANT[I]) is established. In a preferred embodiment, PIC_ANT[I] comprises ($N_{ac}$) active channels. Currently active channels can comprise channels that are being used and channels that are reserved for future use.

In a preferred embodiment, the satellite determines the number of active channels; that is, the channels that are operating at the current time on a potentially interfering antenna. Potentially interfering antennas are defined relative to the SU's location. Only those channels that are operating on a potentially interfering antenna have a cost function associated with them that need to be computed.

In a preferred embodiment, potentially interfering antennas are determined based on cell size and position relative to a SU's current location. For example, when two cells overlap at the SU's current location, the antennas associated with the two cells can be identified as potentially interfering antennas. In addition, when two cells are close to the SU's current location, the antennas associated with the two cells can be identified as potentially interfering antennas. In one example, cells are close to a SU when they are within one hundred kilometers of the SU's current location.

In step 414, a second counting variable (J) is initialized. In a preferred embodiment, J is set to one (J=1).

In step 416, a stored list is used to determine the channels to use to compute cost functions for this particular operating channel [J] on this particular antenna [I]. Using this previously stored list allows the satellite to compute a smaller number of cost functions. Cost functions for the particular channels [K] not on the stored list are assumed negligible and are not computed. The stored list was established using a procedure such as that illustrated in FIG. 3.

In step 418, a third counting variable (K) is initialized. In a preferred embodiment, K is set to one (K=1). This third counting variable is used to keep track of the particular channel that is currently being examined. K is desirably large enough to maintain a counting record for all the channels available in the system. In step 420, a cost function is computed for this J(th) active channel on the I(th) potentially interfering antenna with K(th) channel on this active channel's potentially interfering channel list. Only the (M) potentially interfering channels for each currently active channel on the potentially interfering antenna currently being examined have cost function computed for them.

In step 422, the computed cost function is compared to a previously computed cost function that is presently in the maximum cost list. In a preferred embodiment, the worst case value determined during the comparison is inserted into the list using K as a pointer in the list (MC_LIST[IC_LIST[K]]). In alternate embodiments, a summation technique can be used, and the cost function in the maximum cost list represents the sum total from all previously computed cost function calculations.

In step 424, the counting variable for a third list is incremented. In a preferred embodiment, K is incremented by one. This ensures that all of the potentially interfering channels for this currently active channel on this currently being examined antenna are examined in an orderly fashion.

In step 426, a query is performed to determine when all of the channels in the list of potentially interfering channels have been examined. When all of the channels in list (PIC_ANT[I][J]) have not been examined, procedure 400 branches back to 422 and iterates as shown in FIG. 4. When all of the channels in list (PIC_ANT[I][J]) have been examined, procedure 400 continues with step 428.

In step 428, the second counting variable is incremented. In a preferred embodiment, J is incremented by one. This ensures that all of the currently active channels on this currently being examined antenna are examined in an orderly fashion.

In step 430, a query is performed to determine when all of the currently active channels on this currently being examined antenna have been examined. When all of the channels in list (PI_ANT[I][J]) have not been examined, procedure 400 branches back to 416 and iterates as shown in FIG. 4. When all of the channels in list (PI_ANT[I][J]) have been examined, procedure 400 continues with step 432.

In step 432, the first counting variable (I) is incremented. In a preferred embodiment, (I) is incremented by one. This ensures that all of the potentially interfering antennas are examined in an orderly fashion. In a preferred embodiment, I, J, K, and Na are positive integers.

In step 434, a query is performed to determine when all of the potentially interfering antennas have been examined. When all of the antennas in list (PI_ANT[I]) have not been examined, procedure 400 branches back to 412 and iterates as shown in FIG. 4. When all of the channels in list (PI_ANT[I]) have been examined, procedure 400 continues with step 436.

In step 436, a channel is allocated to the subscriber unit and its associated user at location (La) having an interference potential that is below a low interference potential threshold. In a preferred embodiment, this threshold is set so that the channel with the lowest cost in MC_LIST is allocated. Desirably, MC_LIST comprises a current picture of currently active channels and their impact on the rest of the available channels in the system from an interference point of view. Typically, a number of allocation channels (channels that can be allocated) are identified using the maximum cost list that have low costs associated with them. Procedure 400 continues to step 440 and ends.

In a preferred embodiment, multiple channel allocations can be accomplished at the same time using the maximum cost list. For example, the ten best channels can be quickly and efficiently identified. In addition, channels having a specific range of values within the maximum cost list can be efficiently determined. This allows boundary levels to be established within the maximum cost list based on levels of service. In this way, channels providing a certain level of service could efficiently be determined. For example, the maximum cost list can be used to identify usable, degraded and non-usable channels.

Desirably, quality of service parameters such as voice quality and bit error rates can be used to establish thresholds that can be used to examine and manage interference potentials. For example, subscriber link channels can be classified into at least three groups based on voice quality. The three groups are usable, degraded, and non-usable. Cost function comparison thresholds can be established within the maximum cost list to cause these three groups to exist with the system. In alternate embodiments, classifications are based on bit error rates.

The maximum cost list can be used to allocate one or more channels to users having different levels of service. For example, some users may accept lower levels of voice quality for a lower cost. By using the maximum cost list, multiple lower quality of service channels can be allocated to some users at the same time that multiple high quality of service channels are allocated to other users.

In alternate embodiments, MC_LIST can be used to identify problem areas in which excessive interference may be occurring. For example, examining MC_LIST for high values can identify these problem areas. In addition, the ability to identify multiple channels having high costs at a particular point in time can be useful in a conflict resolution procedure. A number of non-usable channels can be identified, and replacement channels can be identified from the maximum cost list at the same time.

In a preferred embodiment, procedure 400 is performed on a frame-by-frame basis in a TDMA system. In alternate embodiments, procedure 400 does not have to be performed on a frame-by-frame basis.

When a satellite allocates one or more channels, they are added to the list of active channels on a particular antenna on this satellite. In addition, channel allocation data is sent to the subset of satellites that are associated with this satellite. The satellites in the subset use this channel allocation data to update their lists of potentially interfering antennas, lists of presently active channels, and maximum cost lists. In alternate embodiments, a satellite also sends channel allocation information to at least one control center.

The ability to allocate multiple channels quickly and efficiently is especially useful in high demand areas and emergencies. For example, an emergency could develop in a particular location. The emergency could lead to an increase in the number of users requesting service from a particular location. In this case, satellites would experience an increased demand for channels as they moved over the affected area, and method and apparatus of the present invention could be used to allocate multiple channels to multiple users quickly and efficiently. In addition, the method and apparatus of the present invention allow cost functions to be altered to accommodate regional and local increases in demand.

The present invention provides a method and apparatus for allocating one or more channels having a known interference cost to one or more subscriber units in a satellite communications system. The system comprises a number of satellites that control a plurality of channels that can be allocated to individual subscriber units. A satellite uses a cost function based analysis to determine which channels to allocate to subscriber units at a particular time.

In summary, a communications system has been described in which satellites allocate channels to SUs in real time. Satellite do not have full autonomy to make channel allocations but rather operate within the confines of at least one subset of satellites. Satellites allocate channels using a maximum cost list. Cost functions are based on spatial isolation, spectral isolation, and temporal isolation.

A list of potentially interfering antennas is determined using a cost function analysis. A list of active channels on each one the potentially interfering antennas is also established. In addition, a list that includes a set of potentially interfering channels for each active channel is established using cost functions. Cost functions are computed for pairs of channels where pairs comprise an active channel and its potentially interfering channels. These cost functions establish interference potentials for a list of available channels. A channel is allocated using the lowest interference potential.

The invention has been described above with reference to a preferred embodiment. However, those skilled in the art will recognize that changes and modifications can be made in this preferred embodiment without departing from the scope of the invention. For example, the procedures and steps identified herein can be categorized and organized differently than described herein while achieving equivalent results.

What is claimed is:

1. In a satellite communications system having a plurality of satellites and a plurality of subscriber units (SUs), said plurality of satellites communicating with said plurality of SUs using a plurality of channels, a method of operating a satellite of a subset of said plurality of satellites for allocating at least one channel to a SU of said plurality of SUs, said method comprising the steps of:

a) receiving a channel request from said SU;

b) creating a maximum cost list (MC_LIST) comprising interference potentials for a set of available channels in said plurality of channels, said interference potentials being determined using at least one cost function, wherein maximum cost list size is established using the number of available channels given said SU's location and the size of the region used in a regionalized channel allocation scheme, whereby regions are established based on satellite subsets; and c) allocating said at least one channel to said SU using said maximum cost list and a low interference potential threshold, whereby communications channels are dynamically allocated in real-time based on actual demand using said regionalized channel allocation scheme.

2. The method as claimed in claim 1, wherein step a) further comprises the step of:

a1) determining said SU's location from said channel request.

3. The method as claimed in claim 1, wherein step a) further comprises the step of:

a1) determining a time of occurrence from said channel request.

4. The method as claimed in claim 1, wherein step b) further comprises the steps of:

b1) selecting a potentially interfering antenna from a first list comprising at least one potentially interfering antenna;

b2) selecting an active channel from a second list comprising at least one active channel on said potentially interfering antenna;

b3) selecting a potentially interfering channel from a third list comprising at least one potentially interfering channel for said active channel;

b4) computing a first interference potential using a cost function based on spatial isolation between said potentially interfering channel and said active channel;

b5) storing said first interference potential in said maximum cost list using said potentially interfering channel as a pointer in said maximum cost list; and b6) repeating steps b3–b5 for each potentially interfering channel in said third list.

5. The method as claimed in claim 4, wherein step b) further comprises the step of:

b7) repeating steps b2–b6 for each active channel in said second list.

6. The method as claimed in claim 5, wherein step b) further comprises the step of:

b8) repeating steps b1–b7 for each potentially interfering antenna in said first list.

7. The method as claimed in claim 4, wherein step c) further comprises the steps of:

c1) identifying at least one allocation channel from said maximum cost list for which said first interference potential is less than said low interference potential threshold; and c2) allocating said at least one channel using a first one of said at least one allocation channel.

8. The method as claimed in claim 4, wherein step b1) further comprises the steps of:

b1a) including a first antenna and a second antenna in said first list when a cell from said first antenna and a cell from said second antenna overlap at a current location for said SU.

9. The method as claimed in claim 4, wherein step b1) further comprises the steps of:

b1b) including a first antenna and a second antenna in said first list when a cell from said first antenna and a cell from said second antenna are within one hundred kilometers of a current location for said SU.

10. The method as claimed in claim 4, wherein step b3) comprises the steps of:

b3a) computing a first cost function using a first channel and a second channel in said plurality of channels wherein said first cost function is a function of spectral isolation between said first channel and said second channel;

b3b) comparing said first cost function to a threshold;

b3c) including said second channel in said third list for said first channel, when said first cost function is less than said threshold; and b3d) repeating steps b3a)–b3c) until all of said set of available channels have been used as said second channel.

11. The method as claimed in claim 4, wherein step b3) comprises the steps of:

b3a) computing a first cost function using a first channel and a second channel in said plurality of channels wherein said first cost function is a function of spectral isolation between said first channel and said second channel;

b3b) comparing said first cost function to a threshold;

b3c) including said second channel in said third list for said first channel, when said first cost function is less than said threshold; and b3d) repeating steps b3a)–b3c) until all of said set of available channels have been used as said second channel.

12. The method as claimed in claim 4, wherein step b3) comprises the steps of:

b3a) computing a first cost function using a first channel and a second channel in said plurality of channels wherein said first cost function is a function of temporal isolation between said first channel and said second channel;

b3b) comparing said first cost function to a threshold;

b3c) including said second channel in said third list for said first channel, when said first cost function is less than said threshold; and b3d) repeating steps b3a)–b3c) until all of said set of available channels have been used as said second channel.

13. The method as claimed in claim 4, wherein step b4) comprises the steps of:

b4) computing said first interference potential using another cost function based on spectral isolation between said potentially interfering channel and said active channel.

14. The method as claimed in claim 4, wherein step b4) comprises the steps of:
   b4) computing said first interference potential using another cost function based on temporal isolation between said potentially interfering channel and said active channel.

15. The method as claimed in claim 1, wherein said method further comprises the steps of:
   e) sending first channel allocation data to at least one satellite in said subset; and
   f) receiving second channel allocation data from said at least one satellite.

16. The method as claimed in claim 1, wherein said method further comprises the step of:
   e) sending first channel allocation information to at least one control center; and
   f) receiving second channel allocation information from said at least one control center.

17. In a satellite communications system having a plurality of satellites and a plurality of subscriber units (SUs), said plurality of satellites communicating with said plurality of SUs using a plurality of channels, a satellite in a subset of said plurality of satellites for allocating at least one channel to a SU of said plurality of SUs using a regionalized channel allocation scheme in which a region is established based on said subset of satellites, said satellite comprising:
   at least one subscriber link transceiver for receiving a channel request from said SU and sending channel allocation data to said SU;
   a controller coupled to said at least one subscriber link transceiver, said controller comprising means for creating a maximum cost list (MC_LIST) that comprises interference potentials for a set of available channels in said plurality of channels, for determining said interference potentials using at least one cost function, for using said maximum cost list and a low interference potential threshold to allocate said at least one channel, for processing said channel request, and for processing said channel allocation data, the size of said MC_LIST being established by said controller using said set of available channels, said SU's location, and the size of said region used in said regionalized channel allocation scheme; and
   at least one crosslink transceiver coupled to said controller for exchanging channel allocation information with at least one satellite in said subset, wherein said controller is further for processing said channel allocation information to update said maximum cost list.

18. The satellite as claimed in claim 17, wherein said controller is further for selecting a potentially interfering antenna from a first list comprising at least one potentially interfering antenna, for selecting an active channel from a second list comprising at least one active channel on said potentially interfering antenna, for selecting a potentially interfering channel from a third list comprising at least one potentially interfering channel for said active channel, for computing said interference potentials using at least one cost function based on spatial isolation between said potentially interfering channel and said active channel, and for storing said interference potentials in said maximum cost list, and using said potentially interfering channel as a pointer in said maximum cost list.

19. The satellite as claimed in claim 18, wherein said satellite further comprises:
   at least one earth link transceiver coupled to said controller for receiving channel allocation information, wherein said controller is further for processing said channel allocation information to initialize said first list, said second list and said third list.

* * * * *